US009275156B2

(12) United States Patent
Zhou et al.

(10) Patent No.: US 9,275,156 B2
(45) Date of Patent: Mar. 1, 2016

(54) TRENDING TOPIC IDENTIFICATION FROM SOCIAL COMMUNICATIONS

(71) Applicant: Microsoft Corporation, Redmond, WA (US)

(72) Inventors: Enkai Zhou, Beijing (CN); Li Haoran, Beijing (CN); Hoachuan Sun, Beijing (CN); Lei Sun, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

(21) Appl. No.: 13/904,445

(22) Filed: May 29, 2013

(65) Prior Publication Data

US 2014/0358885 A1 Dec. 4, 2014

(51) Int. Cl.
G06F 7/00 (2006.01)
G06F 17/30 (2006.01)
G06Q 10/10 (2012.01)

(52) U.S. Cl.
CPC .... *G06F 17/30873* (2013.01); *G06F 17/30864* (2013.01); *G06F 17/30882* (2013.01); *G06Q 10/101* (2013.01)

(58) Field of Classification Search
CPC .................................................. G06F 17/30882
See application file for complete search history.

(56) References Cited

U.S. PATENT DOCUMENTS

| 8,402,031 B2 | 3/2013 | Govani et al. |
| 2009/0019085 A1 | 1/2009 | Abhyanker |
| 2010/0211432 A1 | 8/2010 | Yiu et al. |
| 2011/0218946 A1 | 9/2011 | Stern et al. |
| 2011/0320715 A1 | 12/2011 | Ickman et al. |
| 2013/0018949 A1 | 1/2013 | Pradeep |
| 2014/0143405 A1* | 5/2014 | Pavlidis et al. ............... 709/224 |

OTHER PUBLICATIONS

Phuvipadawat, et al., "Breaking News Detection and Tracking in Twitter", Retrieved at <<http://ieeexplore.ieee.org/stamp/stamp.jsp?tp=&arnumber=5616930>>, In International Conference on Web Intelligence and Intelligent Agent, Aug. 31, 2010, pp. 4.
Jackoway, et al., "Identification of Live News Events using Twitter", Retrieved at <<http://www.cs.umd.edu/~hjs/pubs/lbsn2011.pdf>>, In 3rd ACM SIGSPATIAL International Workshop on Location-Based Social Networks, Nov. 1, 2011, pp. 8.
Sankaranarayanan, et al., "TwitterStand: News in Tweets", Retrieved at <<http://nsl.cse.unt.edu/~enkh/classes/csce6350/Media/twitterStandNewsInTweets.pdf>>, In 17th ACM SIGSPATIAL International Conference on Advances in Geographic Information Systems, Nov. 4, 2009, pp. 10.

(Continued)

*Primary Examiner* — Ajith Jacob
(74) *Attorney, Agent, or Firm* — Dave Ream; Tom Wong; Micky Minhas

(57) ABSTRACT

Systems and methods for identifying trending topics from social communications are presented. Social communications from one or more social networking sites are obtained. Links within the social communications are extracted. In various embodiments, the extracted links are filtered such that the linked content corresponding to the extracted links that can be categorized as news are retained. Topic descriptors for the retained links are generated and the topic descriptors are stored in a trending topic data store as trending topics. According to various embodiments, the topic descriptors are stored in the trending topic data store with the extracted links.

19 Claims, 7 Drawing Sheets

(56) References Cited

OTHER PUBLICATIONS

Agarwal, et al., "Catching the Long-Tail: Extracting Local News Events from Twitter", Retrieved at <<http://www.aaai.org/ocs/index.php/ICWSM/ICWSM12/paper/view/4639/5011>>, In 6th International AAI Conference on Weblogs and Social Media, Jun. 4, 2012, pp. 4.

Younus, et al., "Ins and Outs of News: Twitter as a Real-Time News Analysis Service", Retrieved at <<http://ceur-ws.org/Vol-694/paper2.pdf>>, In Workshop on Visual Interfaces to the Social and Semantic Web, Feb. 13, 2011, pp. 9.

Kwak, et al., "What is Twitter, a Social Network or a News Media?", Retrieved at <<http://cs.wellesley.edu/~cs315/Papers/What%20is%20twitter-a%20social%20net%20or%20news%20media.pdf>>, In Proceedings of 19th International World Wide Web Conference, Apr. 26, 2010, pp. 10.

"Personalized News Feed based on Peer and Personal Activity", U.S. Appl. No. 13/106,149, filed May 12, 2011, pp. 25.

"Interaction Model for Serving Popular Queries in Search Box", U.S. Appl. No. 13/671,589, filed Nov. 8, 2012, pp. 26.

\* cited by examiner

TRENDING TOPIC IDENTIFICATION FROM SOCIAL COMMUNICATIONS

BACKGROUND

News distribution is one of the many features that arise from the use of social networking sites. For example, a person may post a social communication to his/her social network in a social networking site, where the social communication references and comments on some news article or content from a news organization. Upon receiving the social communication, one or more of the receiving members of the social network may comment on or repost the original social communication, and these comments/reposts are delivered or made available to members of their respective social networks. In this manner, news distribution through social networking sites is said to "go viral", meaning a widespread, growing distribution of news content through social networking sites often occurring within a short amount of time. News content that is "going viral," i.e., in the process of the widespread, growing distribution of the news content, is referred to as trending news content.

Due, at least in part, to the importance of delivering timely to people, there have been attempts to identify trending news content from social communications of various social networking sites. However, timely identifying news content among the vast amount social communications that are posted, as well generating informative summary topics, has proven to be a difficult challenge.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According aspects of the disclosed subject matter, a method for identifying trending topics on social networking sites is presented. The method includes obtaining a plurality of social communications posted on one or more social networking sites. Links within the social communications are extracted and a set of potential topic descriptors are determined. A topic descriptor from the set of potential topic descriptors is selected and the selected topic descriptor is stored with the content as a trending topic of a social networking site.

According to additional aspects of the disclosed subject matter, computer-readable media bearing computer executable instructions for identifying trending topics on social networking services is presented. In execution on a processor, the computer executable instructions carry out a method comprising first obtaining a plurality of social communications posted on one or more social networking sites. A plurality of links to content from the plurality of social communications is extracted from the social communications, wherein each of the plurality of links is a link to different content. For each of the plurality of links to content, the method categorizes the linked content according to news or non-news. Moreover, a set of potential topic descriptors is determined for the linked content categorized as news. A topic descriptor is selected from the set of potential topic descriptors and the selected topic descriptor is stored with the content as a trending topic in a trending topic data store.

According to further aspects of the disclosed subject matter, a computer system for identifying trending topics on social networking sites is presented. The computer system comprises at processor and a memory wherein the processor executes instructions stored in the memory as part of or in conjunction with additional components to identify trending topics on social networking services. These additional components include, by way of illustration and not limitation: a social communication retrieval component to obtain social communications from one or more social networking sites; a link extraction component configured to extract a plurality of links to content from the social communications; a news evaluation component configure to filter the plurality of links to content according to whether or not the linked content can be categorized as news; and a topic descriptor generator that, for each link to content that can be categorized as news, generates a topic descriptor for each of the items of content and stores the generated topic descriptor with the corresponding link in a trending topic data store as a trending topic.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposed of clarity, the use of the term "exemplary" in this document should be interpreted as serving as an illustration or example of something, and it should not be interpreted as an ideal and/or a leading illustration of that thing. Additionally, a social networking site (also called a social networking service) refers to an online platform/service in which a computer user can build and interact with social networks or social relations with other people and groups for various purposes, including by way of illustration and not limitation, shared interests, activities, backgrounds, or real-life connections. Typically, social networking sites allow computer users to share ideas, pictures, posts, activities, events, and interests with people and groups in their social network.

The term "social communication" should be interpreted as a general term in which a computer user is sharing content on a social networking site. By way of illustration and not limitation, this content may include ideas, comments, views, pictures, videos, activities, events, and/or interests. Often, though not exclusively, social communications may include links (sometimes referred to as hypertext links) that reference content outside of the social communication. While each social networking site (or service) may employ its own set of terminology, including the terminology given to the act of sharing a social communication (e.g., "tweet," "post," and the like), active term "post" will be used in this application to indicate the act of sharing a social communication on a social networking site. In other words, a computer user will "post" a social communication on a social networking site.

Figure 1:
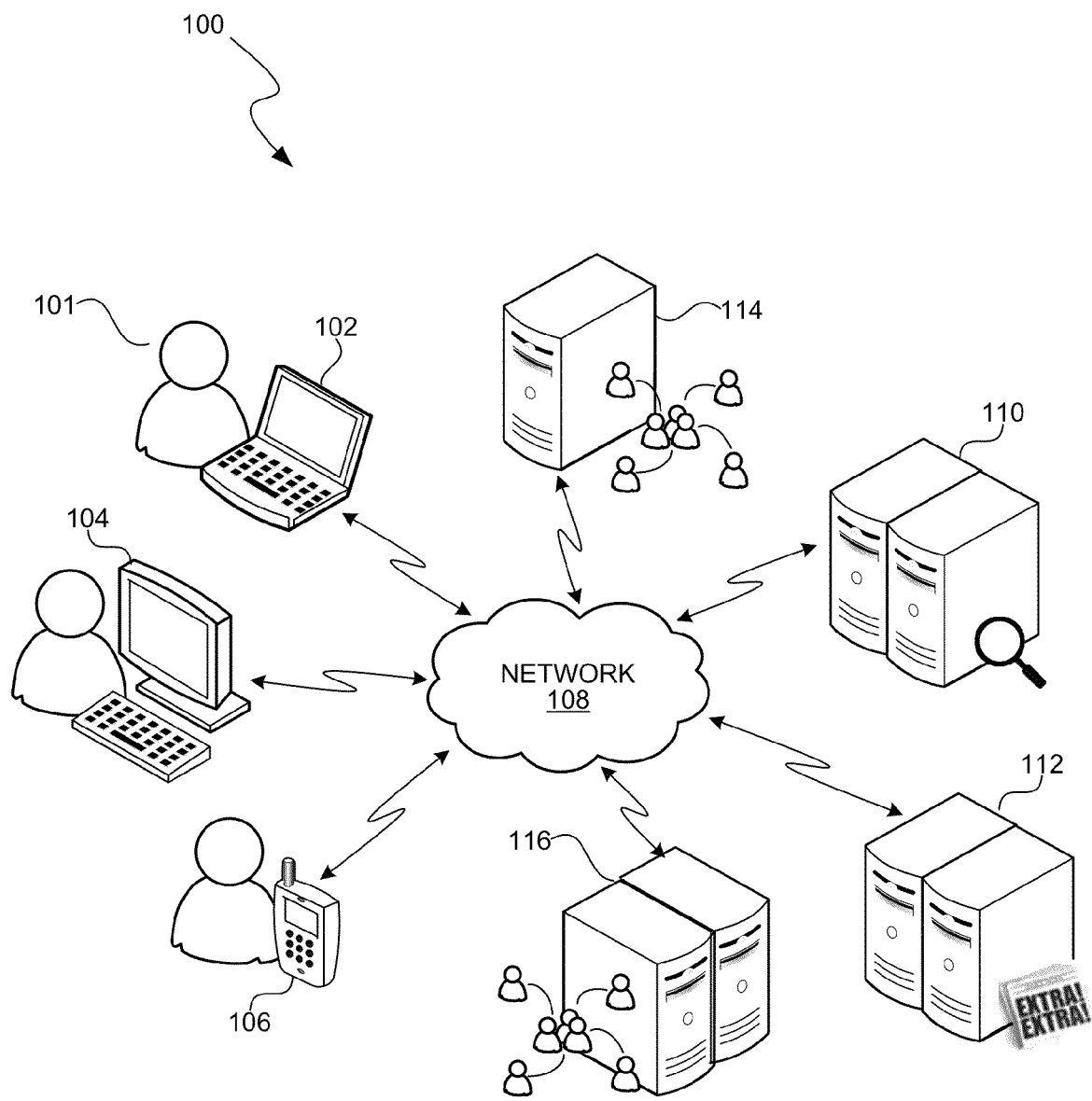
FIG. 1 is a network environment suitable for implementing aspects of the disclosed subject matter.

Turning to FIG. 1, FIG. 1 is a block diagram illustrating an exemplary networked environment 100 suitable for implementing aspects of the disclosed subject matter, particularly in regard to identifying trending topics of news content. The exemplary networked environment 100 includes one or more user computers, such as user computers 102-106, connected to a network 108, such as the Internet, a wide area network or WAN, and the like. Also connected to the network 108 are various networked sites 110-116. User computers include, by way of illustration and not limitation: desktop computers (such as user computer 104); laptop computers (such as user computer 102); tablet computers (not shown); mobile devices (such as mobile device 106); game consoles (not shown); personal digital assistants (not shown); and the like. A computer user, such as computer user 101, may navigate to these and other networked sites (not shown) to view content hosted on the sites. By way of example and not limitation, the networked sites include a trending topic service 110, news site 112, and social networking sites 114-116.

The trending topic service 110 is configured to identify trending topics of news content according to social communications from one or more social networking sites, such as the social networking sites 114-116. According to various embodiments, the trending topic service 110 may be implemented as part of an online search engine that responds to search queries from computer users. In another non-limiting embodiment, the trending topic service 110 may be implemented as part of a social networking site. Irrespective of the exact configuration of the trending topic service 110 (i.e., whether it is part of a search engine, a social networking site, an online news site, another online service, or implemented as an independent service), the trending topic service obtains social communications from one or more social networking sites and identifies trending topics of news content.

As mentioned above, a social networking site, such as social networking sites 114-116, corresponds to an online platform/service in which a computer user can build and interact with social networks or social relations with other people and groups for various purposes, including by way of illustration and not limitation, shared interests, activities, backgrounds, or real-life connections. Examples of social networking sites include, by way of illustration and not limitation, Facebook, Twitter, FourSquare, LinkedIn, Google+, and the like. Often, the social communications posted on these various social networking sites are made in regard to events and/or developments that are considered "newsworthy," i.e., information and/or commentary describing events, topics, developments and the like. Additionally, the social communications may be related to and include links to established news content, such as news content hosted by news site 112.

Figure 2:
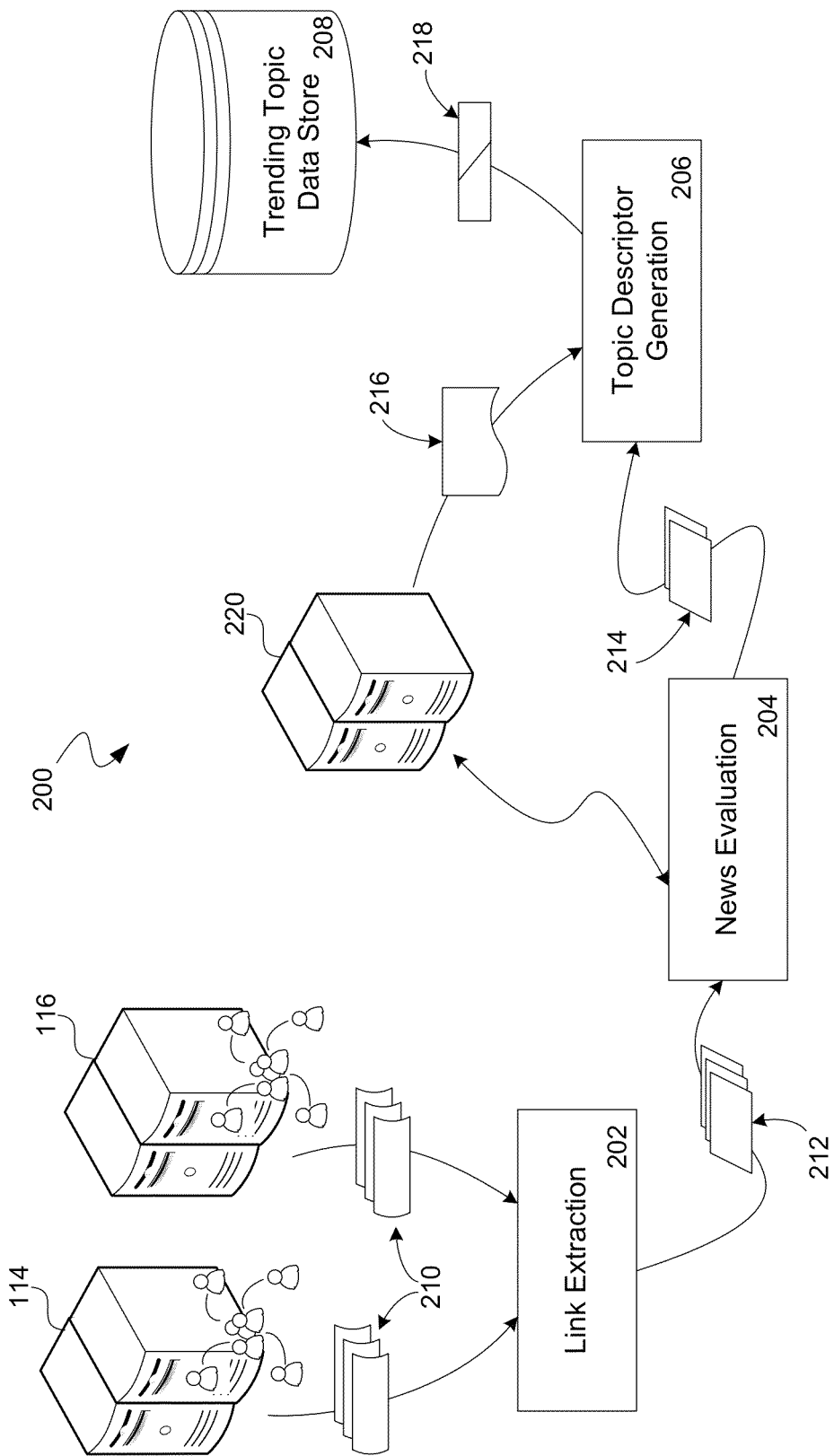
FIG. 2 is a block diagram illustrating the processing flow of social communications in identifying trending news topics from social networking sites, such as social networking sites.
Figure 3:
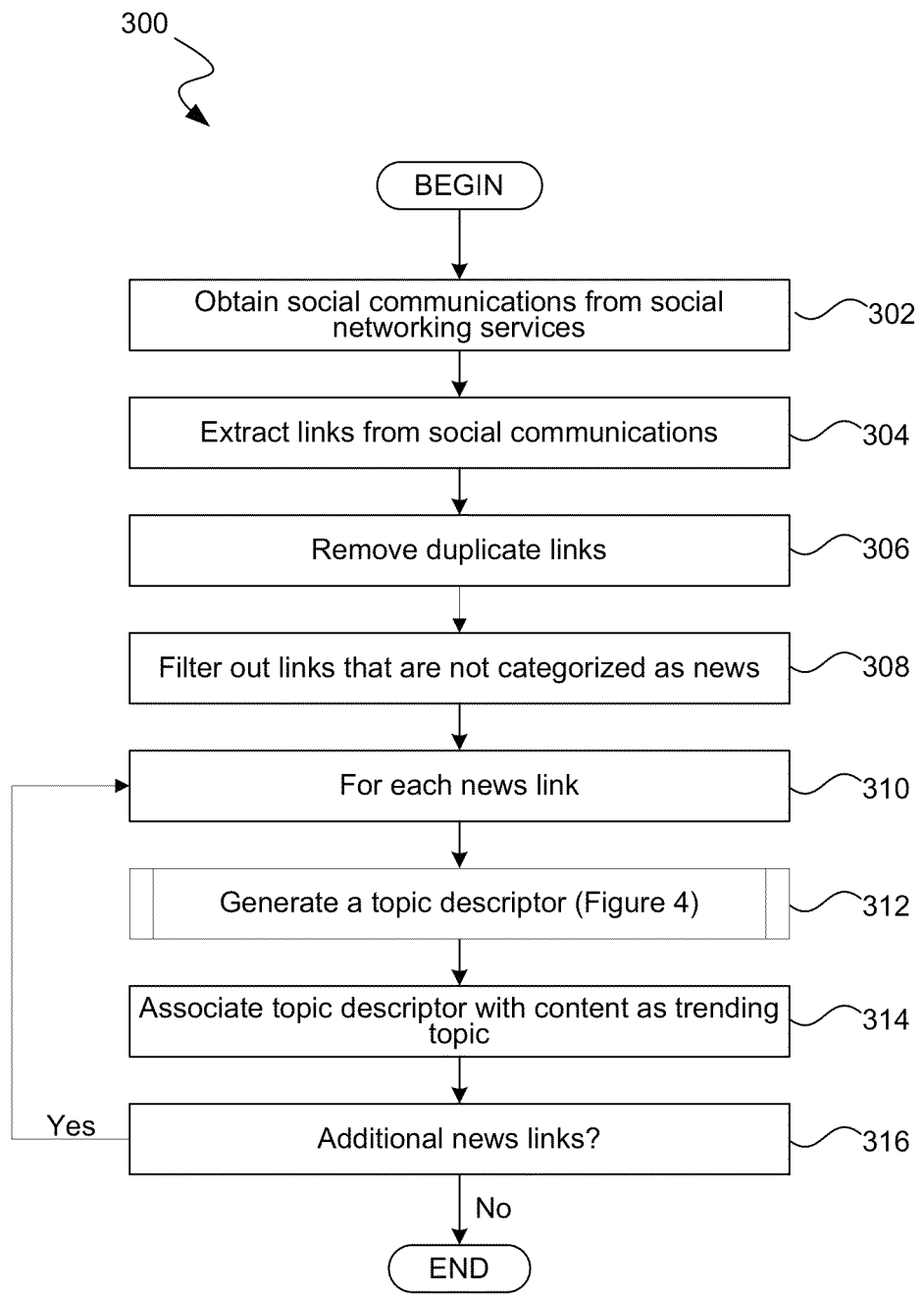
FIG. 3 is a flow diagram illustrating an exemplary routine for identifying trending news topics from social networking sites.

According to aspects of the disclosed subject matter, a suitably configured trending topic service 110 obtains the social communications from one or more social networking sites, such as social networking sites 114 and 116 to identify trending topics news topics from social networking sites. Identifying trending topics from social networking sites 114-116 according to social communications is described in greater detail with regard to FIGS. 2 and 3. FIG. 2 is a block diagram illustrating the processing flow of social communications in identifying trending news topics from social networking sites, such as social networking sites 114 and 116. FIG. 3 is a flow diagram illustrating an exemplary routine 300 for identifying trending news topics from social networking sites.

With reference to both FIGS. 2 and 3, and in regard to routine 300, at block 302, the trending topic service 110 obtains social communications 210 corresponding to a recent period from one or more social networking sites, such as social networking sites 114 and 116. As indicated in FIG. 2 at 202, at block 304, trending topic service 110 extract links to content from the obtained social communications. According to one embodiment, in addition to extracting links, at block 306 duplicate links (i.e., links referencing the same content) are removed.

As indicated in FIG. 2 at 204, at block 308, the linked content of the extracted links 212 is filtered according to whether the linked content of the links 212 can be categorized as "news" or "not-news". According to one embodiment, the trending topic service 110 utilizes an internal component to evaluate whether the linked content is news or not. Alternatively, as shown in FIG. 2, the trending topic service 110 may query a search engine 220, such as Microsoft's® Bing search engine, which provides such services, to determine whether the linked content is news or not. The output of block 308 is a filtered set of links to linked content, where the linked content may be categorized as news.

As indicated at FIG. 2 at 206, topic descriptors are generated. More particularly, at block 310, an iteration loop is begun to iterate through each of the filtered links 214. More particularly, in iterating through the filtered links 214, each of the filtered links is addressed individually, with each link being treated as the current link it its turn. Hence, at block 312, a topic descriptor is generated for the linked content of the current link. Generating a topic descriptor for the linked content of the current link is discussed in regard to routine 400 of FIG. 4.

Figure 4:
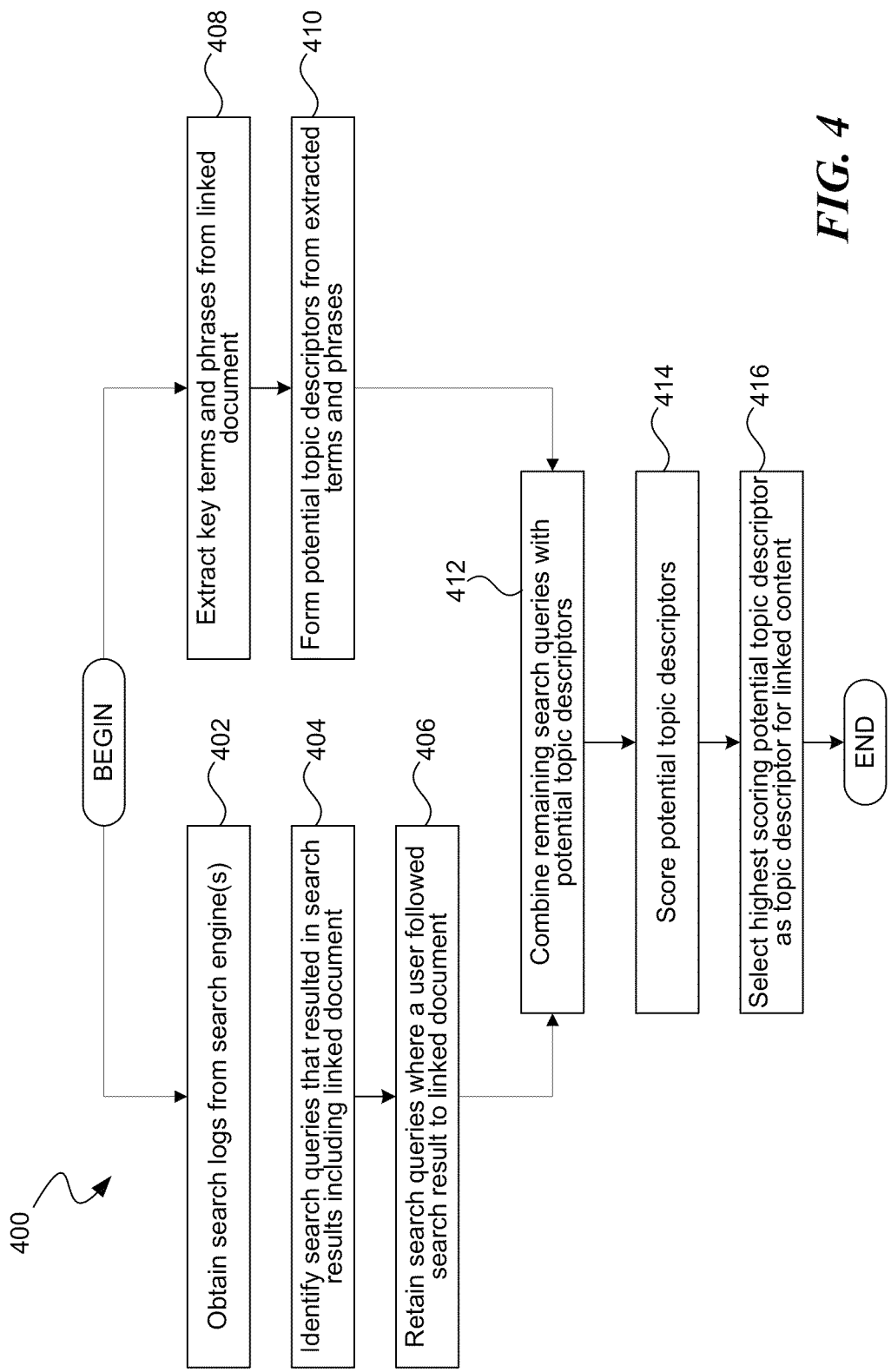
FIG. 4 is a flow diagram illustrating an exemplary routine for generating one or more topic descriptors for an item of linked content.

Turning to FIG. 4, this figure is a flow diagram illustrating an exemplary routine 400 for generating one or more topic descriptors for an item of linked content. Beginning at block 402 (of a first of two processes to determine one or more topic descriptors), search logs 216 from one or more search engines, such as search engine 220, are obtained. According to one embodiment, the search logs 216 include search queries that were submitted to the search engine (typically for a specified period of time) and corresponding search results (i.e., links to content). A count as to the number of times or frequency that the search query was issued is also typically included. Moreover, the search logs 216 may also indicate which search results links a computer user followed after submitting the search query. Hence, at block 404, the trending topic service 110 identifies those search queries whose corresponding search results included the current link (from routine 300). For purposes of generating a topic descriptor for the linked content of the current link, those search queries that did not include the current link are discarded. The result is a set of search queries whose search results include the current link. At block 406, an additional (optional) filter may be applied to the resulting set of search queries to the effect that only those search queries in which the submitting computer user "clicked through" (i.e., navigated to) the linked content of the current link are retained or identified. In at least one embodiment, the search queries where the computer user did not navigate to the linked content of the current link are discarded for purposed of routine 400. Alternatively, the search queries that indicate that the computer user navigated to the linked content of the current link are identified such that they may be given greater weight in selecting an optimal a topic descriptor. Additionally, though not indicated in routine 400, the counts (the number of times that a given search query was submitted to the search engine 220 during the requested period) are also retained for purposed of selecting an optimal a topic descriptor. The result is a set of search queries that are potential topic descriptors for the current link.

At block 408, key terms and phrases are extracted to a memory from the linked content of the current link. According to one embodiment, the key terms and phrases of the linked content are identified according to a natural language processor and/or a lexical analysis tool. Both natural language processing and lexical analysis to extra key terms and phrases are known in the art. After extracting the key terms and phrases from the linked content, at block 410, the natural language processor and/or the lexical analysis tool constructs one or more potential topic descriptors according to combinations of the various key terms and phrases.

At block 412, the potential topic descriptors derived from the search logs 216 and the potential topic descriptors derived from the key terms and phrases are combined. At block 414, the combined set of potential topic descriptors are scored according to various heuristics including, but not limited to, an estimation as to how informative a potential topic descriptor is; the number of times that the potential topic descriptor was submitted as a search query to a search engine; how lexically correct the potential topic descriptor is formed; and the like. The goal is to score the potential topic descriptors such that an optimal topic descriptor can be identified. Thus, after scoring each of the potential topic descriptors, at block 416 the optimal (i.e., highest scoring) topic descriptor is selected as the optimal, generated topic descriptor for the current link. The selected topic descriptor may be then associated with the content as a trending topic or, alternatively, may simply be stored as a trending topic (without the content.) Thereafter, routine 400 terminates.

Returning to routine 300 of FIG. 3, the generated topic descriptor is associated with the linked content in a trending topic data store 208. More particularly, the pair 218 of the generated topic descriptor and the current link is stored in the trending topic data store as a trending topic. At block 316, if there are any additional links to process in the iteration loop, the process returns to block 310 where the next link is selected and the steps of blocks 312-316 are repeated. However, when it is determined that there are no additional links to process, the routine 300 terminates.

Figure 5:
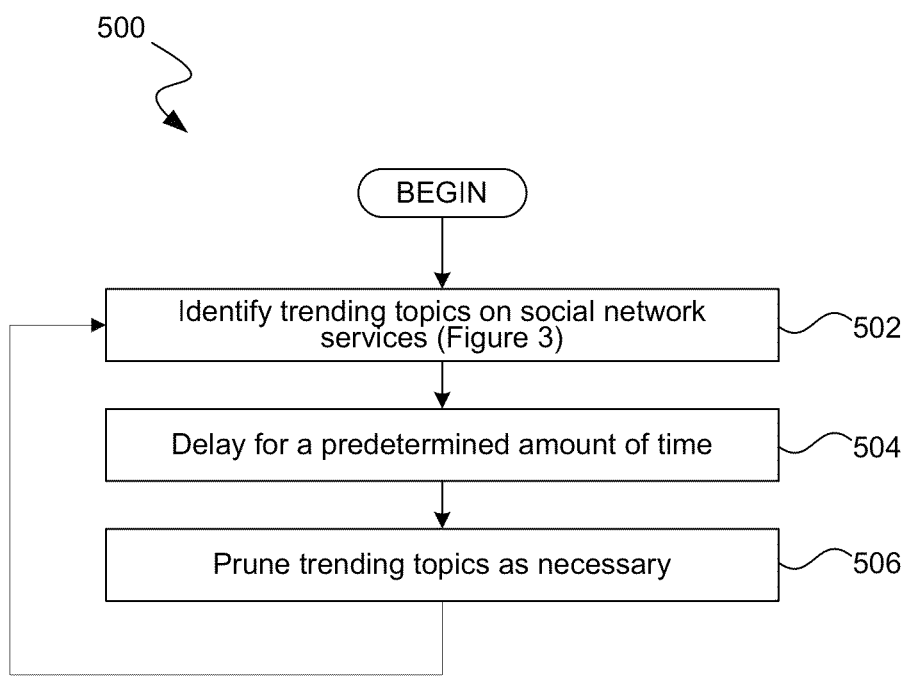
FIG. 5 is a flow diagram illustrating an exemplary routine for periodically regenerating trending news topics from social networking sites.

As will be appreciated, topics often only enjoy a short time period of popularity especially in regard to trending/popular topics on social networking sites. According, it may be advantageous to periodically update the set of trending topics. FIG. 5 is a flow diagram illustrating an exemplary routine 500 for periodically generating/regenerating trending news topics from social networking sites, such as social networking sites 114-116. Beginning at block 502, current trending and/or popular topics on social networking sites are identified, as discussed above in regard to FIGS. 2 and 3. At block 504, a delay for a predetermined amount of time is made. For example, a web site that displays trending topics may obtain a refreshed set of trending topics every 6 hours. Of course, trending topic of a first period of time may or may not be included as a trending topic of a subsequent period of time. As will be appreciated, the trending topics are a function of what computer users on social networking sites are posting and/or sharing. At block 506, all or some of the previously determined trending topics are removed. Thereafter, the routine 500 returns to block 502 and repeats the process.

Figure 6:
FIG. 6 is a pictorial diagram illustrating an exemplary web page including trending news topics on social networking sites.

As indicated above, the trending topics generated by the trending topic service 110 may be utilized by any number of network sites. For example, a search engine, such as search engine 220, may indicate trending topics of social networking sites on one or more of its web pages. FIG. 6 is a pictorial diagram illustrating an exemplary web page 600 that includes trending news topics from one or more social networking sites. As can be seen, the exemplary web page 600 includes a trending topics section 602 that includes multiple trending topics 604-608, each with a corresponding trending topic description 610-614. According to at least one embodiment, the trending topics 604-608 are presented on the web page 600 such that by selecting (clicking, touching, through keyboard interaction, voice commands, and the like) a trending topic the computer user is taken to the linked content.

Regarding routines 300, 400 and 500, while these routines are expressed in regard to discrete steps, these steps should be viewed as being logical in nature and may or may not correspond to any actual and/or discrete steps of a particular implementation. Nor should the order in which these steps are presented in the various routines be construed as the only order in which the steps may be carried out. Moreover, while these routines include various novel features of the disclosed subject matter, other steps (not listed) may also be carried out in the execution of the routines. Further, those skilled in the art will appreciate that logical steps of these routines may be combined together or be comprised of multiple steps. Steps of routines 300, 400 and 500 may be carried out in parallel or in series. For example, routine 400 is illustrated as having parallel paths but this is just an example of one embodiment and should not be construed as the only arrangement of the routine. Often, but not exclusively, the functionality of the various routines is embodied in software (e.g., applications, system services, libraries, and the like) that is executed on computer hardware and/or systems as described below in regard to FIG. 7. In various embodiments, all or some of the various routines may also be embodied in hardware modules, including but not limited to system on chips, specially designed processors and or logic circuits, and the like on a computer system.

While many novel aspects of the disclosed subject matter are expressed in routines embodied in applications (also referred to as computer programs), apps (small, generally single or narrow purposed, applications), and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions store stored on the computer-readable storage devices are executed, they carry out various steps, methods and/or functionality, including those steps, methods, and routines described above in regard to routines 300, 400 and 500. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

Figure 7:
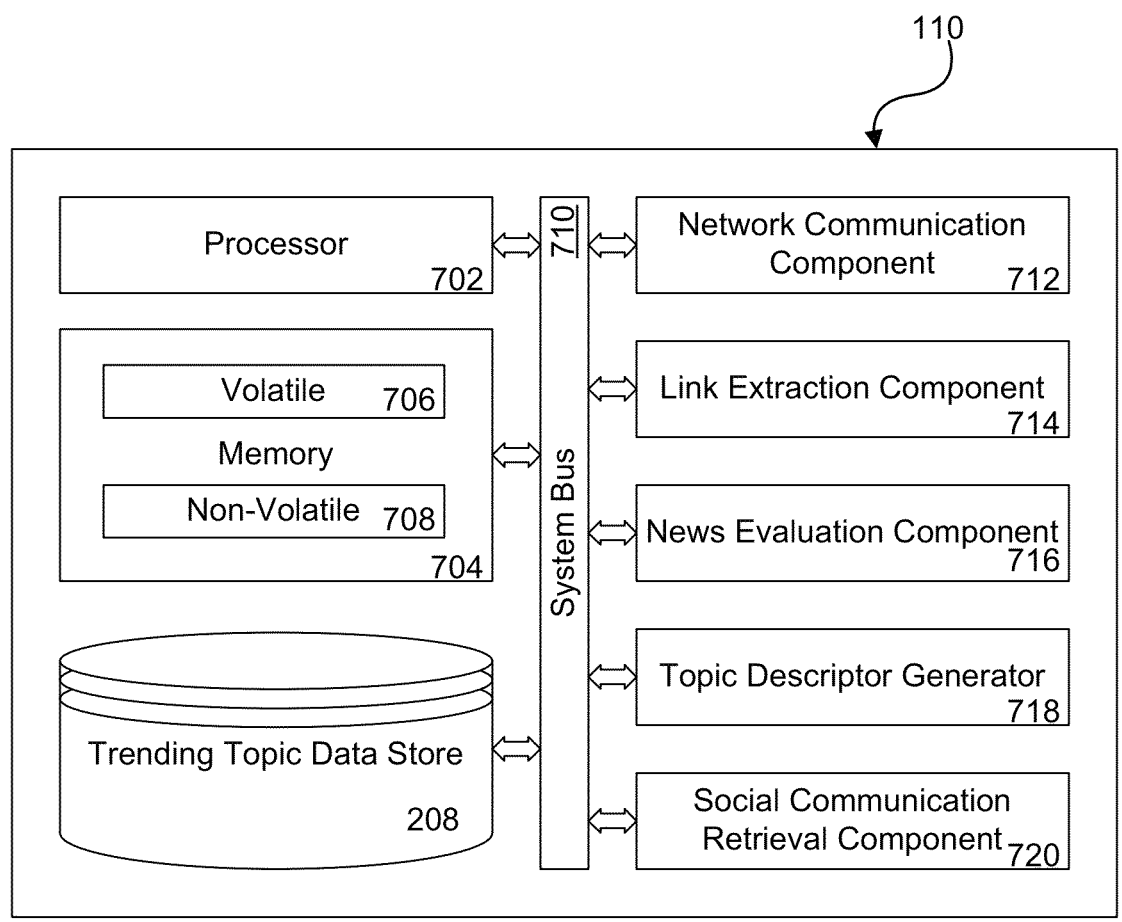
FIG. 7 is a block diagram illustrating an exemplary computer system suitable for identifying trending topics on social networking sites according to social communications.

Turning now to FIG. 7, FIG. 7 is a block diagram illustrating an exemplary trending topic service 700 implemented on a computer system for identifying trending topics on social networking sites according to social communications. As shown in FIG. 7, the trending topic service 700 includes a processor 702 (or processing unit) and a memory 704 interconnected by way of a system bus 710. As those skilled in the art will appreciated, memory 704 typically (but not always) comprises both volatile memory 706 and non-volatile memory 708. Volatile memory 706 retains or stores information so long as the memory is supplied with power. In contrast, non-volatile memory 708 is capable of storing (or persisting) information even when a power supply is not available. Generally speaking, RAM and CPU cache memory are examples of volatile memory whereas ROM and memory cards are examples of non-volatile memory.

The processor 702 executes instructions retrieved from the memory 704 in carrying out various functions, particularly in regard to identifying trending topics on social networking sites according to social communications. The processor 702 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: mini-computers; mainframe computers, personal computers (e.g., desktop computers, laptop computers, tablet computers, etc.); handheld computing devices such as smartphones, personal digital assistants, and the like; microprocessor-based or programmable consumer electronics; game consoles, and the like.

The system bus 710 provides an interface for the various components to inter-communicate. The system bus 710 can be of any of several types of bus structures that can interconnect the various components (including both internal and external components). The trending topic service 700 further includes a network communication component 712 for interconnecting the network site with other computers (including, but not limited to, user computers such as user computers 102-106, other network sites including social networking sites 114-116, news site 112, one or more search engines (not shown) as well as other devices on a computer network 108. The network communication component 712 may be configured to communicate with an external network, such as network 108, via a wired connection, a wireless connection, or both.

The trending topic service 700 also includes a social communication retrieval component 720. The social communication retrieval component 720 obtains social communications from one or more social networking sites, such as social networking sites 114 and 116. As discussed, according to various embodiment the social communication retrieval component 720 obtains social communications from one or more social networking sites corresponding to a predetermined prior period of time, such as (by way of illustration and not limitation) the past 12 hours, the past hour, the past day, and the like. According to still further embodiments of the disclosed subject matter, the social communication retrieval component 720 may be configured to obtain social communications from only those social networking sites to which a computer user has subscribed. Moreover, in yet a further embodiment, the social communication retrieval component 720 may be configured to obtain social communications from only those social networking sites to which a computer user has subscribed and social communications from members of the computer user's social networks.

The trending topic service 700 also includes a link extraction component 714, a news evaluation component 716, a topic descriptor generator 716, and a trending topic data store 208. The link extraction component 714 scans the obtained social communications and extracts to a memory links to external content (typically in the form of universal resource locators (URLs) or universal resource identifiers (URIs)) within the social communications. In extracting links from the social communications, the link extraction component 714 is also configured to delete duplicates. The news evaluation component 716 filters the links extracted by the link extraction component according to whether or not the linked content can be categorized as news content, retaining those links that can be categorized as news content. The topic descriptor generator 716 generates a topic descriptor for the linked content (as discussed above in regard to routine 400 of FIG. 4) and stores a trending topic pair 218 (comprising a generated topic descriptor and a current link to the corresponding content) in the trending topic data store.

While not shown, the trending topic service 700 may also include a timing component such that the trending topic service 700 periodically determines trending topics from social networking sites, as well as a component for purging the trending topic data store 208 of old trending topic pairs.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for identifying trending topics on social networking services, the method comprising:
   obtaining a plurality of social communications posted on one or more social networking services;
   extracting a plurality of links from the plurality of social communications, each of the plurality of links corresponding to a different linked content; and
   for each of the plurality of links:
      categorizing the linked content according to news or non-news; and
      retaining the links to linked content categorized as news;
   determining a set of potential topic descriptors for the linked content;
   selecting a topic descriptor from the set of potential topic descriptors; and
   storing the selected topic descriptor as a trending topic.

2. The computer implemented method of Claim 1 further comprising:
   for each of the plurality of links:
      determining a set of potential topic descriptors for the linked content;
      selecting a topic descriptor from the set of potential topic descriptors; and
      storing the selected topic descriptor as a trending topic.

3. The computer implemented method of claim 2, wherein determining a set of potential topic descriptors for the linked content comprises executing a lexical analysis tool to determine the set of potential descriptors, wherein the lexical analysis tool is configured to:
   extract key terms and phrases from the linked content; and
   generate a set of potential topic descriptors from the extracted key terms and phrases.

4. The computer implemented method of claim 3, wherein determining a set of potential topic descriptors for the linked content further comprises:

comparing the link with one or more search logs obtained from at least one search engine;
identifying search queries from the search logs that resulted in search results that included the link; and
including the identified search queries as potential topic descriptors in the set of potential topic descriptors.

5. The computer implemented method of claim 4, wherein selecting a topic descriptor from the set of potential topic descriptors comprises:
scoring each potential topic descriptor of the set of potential topic descriptors; and
selecting the highest scoring potential topic descriptor as the selected topic descriptor.

6. The computer implemented method of claim 5, wherein scoring each potential topic descriptor of the set of potential topic descriptors comprises scoring each potential topic descriptor according to an estimation of how informative is the potential topic descriptor using a lexical analysis tool.

7. The computer implemented method of claim 6, wherein scoring each potential topic descriptor of the set of potential topic descriptors further comprises, for each potential topic descriptor that was identified as a search query that resulted in search results that included a corresponding link, further scoring the potential topic descriptor according to the frequency of the search query in the search logs.

8. The computer implemented method of claim 2, wherein determining a set of potential topic descriptors for the linked content comprises:
comparing the link with one or more search logs obtained from at least one search engine;
identifying search queries from the search logs that resulted in search results that included the link; and
including the identified search queries as potential topic descriptors in the set of potential topic descriptors.

9. The computer implemented method of claim 8, wherein selecting a topic descriptor from the set of potential topic descriptors comprises:
scoring each potential topic descriptor of the set of potential topic descriptors; and
selecting the highest scoring potential topic descriptor as the selected topic descriptor.

10. The computer implemented method of claim 9, wherein scoring each potential topic descriptor of the set of potential topic descriptors comprises, for each potential topic descriptor that was identified as a search query that resulted in search results that included a corresponding link, further scoring the potential topic descriptor according to the frequency of the search query in the search logs.

11. The computer implemented method of claim 2, wherein selecting a topic descriptor from the set of potential topic descriptors comprises:
scoring each potential topic descriptor of the set of potential topic descriptors; and
selecting the highest scoring potential topic descriptor as the selected topic descriptor.

12. A computer readable medium bearing computer executable instructions which, when executed on a computing system comprising at least a processor executing instructions retrieved from the medium, carry out a method for identifying trending topics on social networking services, the method comprising:
obtaining a plurality of social communications posted on one or more social networking services;
extracting a plurality of links to content from the plurality of social communications, wherein each of the plurality of links is a link to different content; and
for each of the plurality of links to content:
categorizing the linked content according to news or non-news;
determining a set of potential topic descriptors for the linked content categorized as news;
selecting a topic descriptor from the set of potential topic descriptors; and
storing the selected topic descriptor as a trending topic.

13. The computer readable medium of claim 12, wherein determining a set of potential topic descriptors for the linked content comprises:
executing a lexical analysis tool to determine the set of potential descriptors, and wherein the lexical analysis tool is configured to:
extract key terms and phrases from the linked content; and
generate a set of potential topic descriptors from the extracted key terms and phrases.

14. The computer readable medium of claim 13, wherein determining a set of potential topic descriptors for the linked content further comprises:
comparing the link with one or more search logs obtained from at least one search engine;
identifying search queries from the search logs that resulted in search results that included the link; and
including the identified search queries as potential topic descriptors in the set of potential topic descriptors.

15. The computer readable medium of claim 14, wherein selecting a topic descriptor from the set of potential topic descriptors comprises:
scoring each potential topic descriptor of the set of potential topic descriptors; and
selecting the highest scoring potential topic descriptor as the selected topic descriptor.

16. The computer readable medium of claim 15, wherein scoring each potential topic descriptor of the set of potential topic descriptors comprises scoring each potential topic descriptor according to an estimation of how informative is the potential topic descriptor using a lexical analysis tool.

17. The computer readable medium of claim 16, wherein scoring each potential topic descriptor of the set of potential topic descriptors further comprises, for each potential topic descriptor that was identified as a search query that resulted in search results that included a corresponding link, further scoring the potential topic descriptor according to the frequency of the search query in the search logs.

18. A computer system for identifying trending topics on social networking sites, the system comprising a processor and a memory, wherein the processor executes instructions stored in the memory as part of or in conjunction with additional components to identify trending topics on social networking services, the additional components comprising:
a social communication retrieval component to obtain social communications from one or more social networking sites;
a link extraction component configured to extract a plurality of links to content from the social communications, each of the plurality of links corresponding to a distinct item of content;
a news evaluation component configure to filter the plurality of links to content according to whether or not the linked content can be categorized as news, retaining those links to content that can be categorized as news; and
a topic descriptor generator that, for each link to content that can be categorized as news, generates a topic descriptor for each of the items of content and stores the generated topic descriptor with the corresponding link in a trending topic data store as a trending topic.

19. The computer system of claim 18, wherein for each link to content that can be categorized as news, the topic descriptor generator is configured to:
- determine a first set of topic descriptors by:
  - extracting key terms and phrases from linked content; and
  - generating one or more potential topic descriptors from the extracted key terms and phrases;
- determine a second set of topic descriptors by:
  - comparing a link with one or more search logs obtained from at least one search engine;
  - identifying search queries from the search logs that resulted in search results that included the link; and
  - including the identified search queries as potential topic descriptors in the set of potential topic descriptors;
- combine the first and second set of topic descriptors;
- score each topic descriptor of the combined set of topic descriptors; and
- select the optimal scoring topic descriptor as the generated topic descriptor for the link.

* * * * *